US006265057B1

United States Patent
Giamati

(10) Patent No.: US 6,265,057 B1
(45) Date of Patent: Jul. 24, 2001

(54) ICE PROTECTION SYSTEM

(75) Inventor: Michael John Giamati, Akron, OH (US)

(73) Assignee: The B. F. Goodrich Company, Richfield, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/819,412

(22) Filed: Mar. 17, 1997

(51) Int. Cl.[7] ............... B32B 3/26; B32B 9/00; B32B 27/38; B64D 15/00
(52) U.S. Cl. ............... 428/304.4; 428/318.4; 428/319.3; 428/414; 428/423.1; 244/134 R; 244/134 A; 244/134 E
(58) Field of Search .............. 244/134 R, 134 E, 244/35 R, 123, 126, 134 C, 134 A; 428/418, 423.1, 325, 414, 304.4, 318.4, 319.3

(56) References Cited

U.S. PATENT DOCUMENTS

| | | | |
|---|---|---|---|
| 3,218,436 | * | 11/1965 | Edwards et al. ............ 219/544 |
| 4,044,184 | * | 8/1977 | Ashida et al. ............ 428/113 |
| 5,344,696 | * | 9/1994 | Hastings et al. ............ 428/220 |
| 5,584,450 | * | 12/1996 | Pisarski ............ 244/134 D |
| 5,807,514 | * | 9/1998 | Grinshpun et al. ............ 264/46.6 |

OTHER PUBLICATIONS

Bender, Rene J., Handbook of Foamed Plastics, Lake Publishing Corp., pp. 94–95, 1965.*
Gauthier, Michelle M., Engineered Materials Handbook, Desk Edition, pp. 368, 389, Nov. 1995.*

* cited by examiner

Primary Examiner—Paul Thibodeau
Assistant Examiner—Holly C. Rickman
(74) Attorney, Agent, or Firm—Renner, Otto, Boisselle & Sklar

(57) ABSTRACT

An anti-icing blanket for preventing the accumulation of ice on aircraft surfaces due to cold soaked fuel disposed beneath the surface comprises a thermally insulative layer bonded to the aircraft surface and an erosion resistant layer disposed over the insulative layer.

24 Claims, 1 Drawing Sheet

ICE PROTECTION SYSTEM

TECHNICAL FIELD OF THE INVENTION

The present invention relates to ice protection systems, and more particularly, a passive icing prevention blanket.

BACKGROUND OF THE INVENTION

The accumulation of ice on aircraft wings and other structural members in flight is a danger that is well known. As used herein, the term structural member is intended to refer to any aircraft surface susceptible to icing, including wings and so forth. Attempts have been made since the earliest days of flight to overcome the problem of ice accumulation. A variety of techniques have been proposed for removing ice from aircraft during flight. A common problem, however, is the accumulation of ice on structural members while the aircraft is sitting on the ground. Once such condition is known as clear ice. Clear ice may form on exposed wing or other surfaces at temperatures well above freezing due to rain or humidity condensation. This ice formation occurs when fuel within wing fuel tanks has been cold soaked to below freezing, resulting in the wing surface temperature being below freezing until the fuel has warmed. Accumulations of clear ice up to one inch thick have been experienced due to this type of icing. Attempts to take off with the accumulation of clear ice on the wings can lead to disastrous results of foreign object damage (FOD) to fuselage rear mounted engines. The clear ice layer breaks free from the wings during rotation and is ingested by the engines, causing loss of power thereof.

Efforts to eliminate clear ice formation and to improve the safety have led to continuing developments to improve versatility, practicality and efficiency.

DISCLOSURE OF THE INVENTION

An object of the present invention is to provide a passive ice protection system which prevents the formation of clear ice on aircraft structures due to cold soaked fuel and structure.

According to the present invention, an ice protection system for preventing ice from forming on an aircraft structure includes a thermal insulation blanket disposed over the structure and a protective layer for disposal over said insulative layer.

The present invention provides an ice protection system which does not require energy from the aircraft or ground power sources. It is easy to manufacture and can be retrofitted on all existing aircraft.

These and other objects, features and advantages of the present invention will become more apparent in light of the detailed description of exemplary embodiments thereof, as illustrated by the drawings.

BEST MODE FOR CARRYING OUT THE INVENTION

Figure 1:
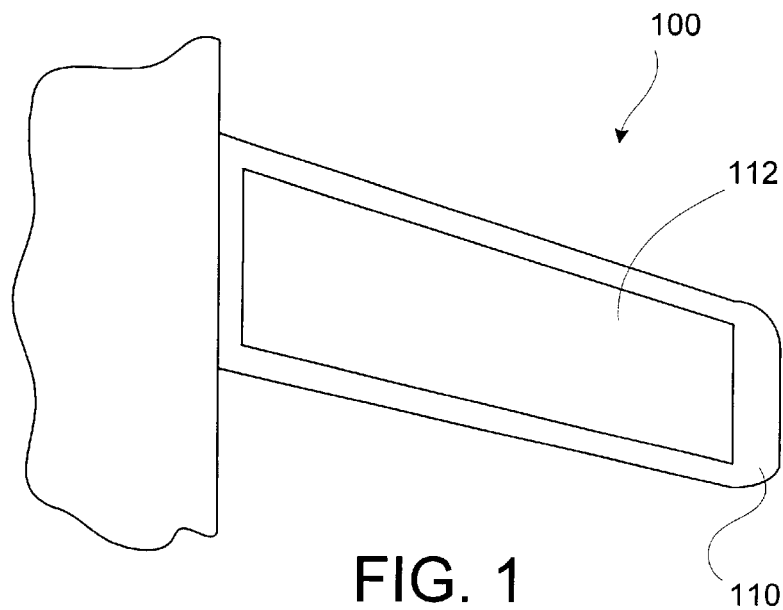
FIG. 1 is a schematic layout of an aircraft wing having an ice protection system in accordance with the present invention.
Figure 2:
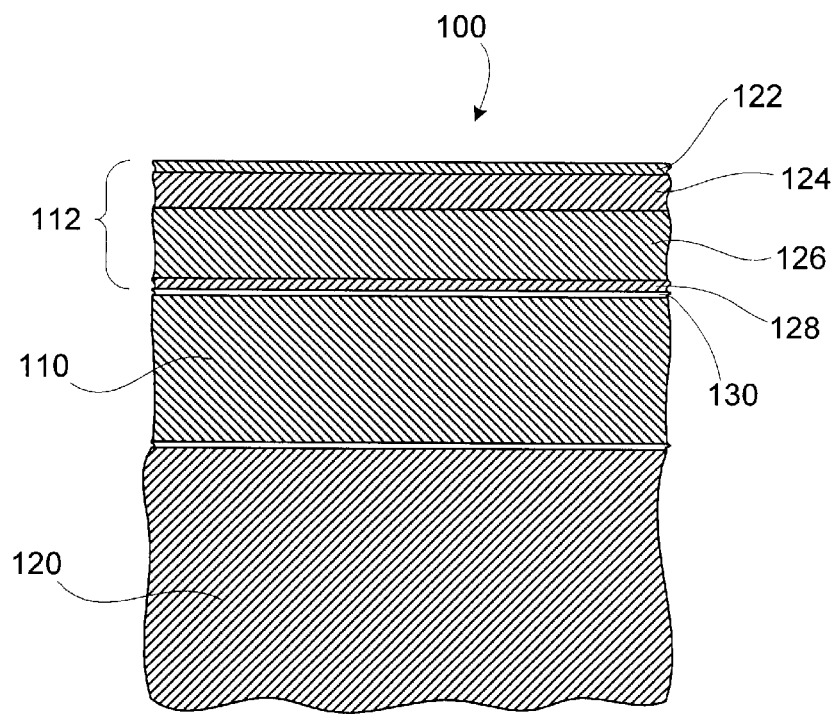
FIG. 2 is a cross sectional view of an aircraft wing having an ice protection system in accordance with the present invention.

Referring now to the drawings wherein like reference numerals designate like or corresponding parts throughout different views, there is shown in FIGS. 1 and 2 an anti-icing system 100 which includes an anti-icing panel 112 installed on an aircraft wing 108. Aircraft wing 108 has installed therein fuel tanks (not shown) for storing fuel. This fuel becomes cooled when the aircraft flies at higher elevations. After landing, the fuel remains cool due to its thermal mass, even though the environmental temperature may be well above the freezing temperature of water. Anti-icing panel 112 is comprised of a thermally insulative material. Without panel 112, the cold fuel would cause rain and water in the air to condense and freeze on the wing 108. Panel 112, however, is not a good thermal conductor and therefore prevents the accumulation of ice on the wing by insulating the cold fuel from the warmer outside air. Because of the good insulative properties of panel 112, it is unnecessary to heat the panel using electrothermal or other heating methods in order to prevent ice build up.

Referring now to FIG. 2, an anti-icing panel or blanket 112 is disposed over an aircraft skin 110. Skin 110 covers the fuel 120. Anti-icing panel 112 is comprised of a top erosion layer 122, preferably a 0.004 inches thick layer of polyurethane paint, such as the Polane system available from Sherwin Williams or other material known to those skilled in art suitable for providing an erosion resistance. A structural layer 124 disposed beneath top layer 128 is preferably comprised of a composite material, such as a 0.007 inch thick fiberglass/epoxy ply. Other materials suitable for providing structural integrity to blanket 112 may be utilized for layer 124. An insulation layer 126 is disposed beneath structural layer 124 and is preferably comprised of a 0.06 inch thick layer of epoxy foam, such as catalog no. HC9872 available from Hysol Aerospace Products. Other thermal insulative materials may be utilized for insulation layer 126. However, for whatever material is used, it is preferred that the total thermal resistance across layer 126 be greater than 0.1063 (ft$^2$ hr ° F.)/BTU. A bonding layer 128 bonds the anti-icing blanket 112 to a paint layer 130 provided over aircraft skin 110. Bonding layer 128 is comprised of a suitable bonding agent for adhering the blanket 112 to the aircraft, such as catalog no. EA9395 epoxy available from Hysol Aerospace Products.

Although the invention has been shown and described with exemplary embodiments thereof, it should be understood by those skilled in the art that the foregoing and various other changes, omissions and additions may be made therein and thereto without departing from the spirit and scope of the invention.

I claim:

1. An article comprising:
    an airfoil having a top; and,
    anti-icing means disposed on the top for preventing the formation of ice without requiring energy from a power source, the anti-icing means comprising
        a) an insulative layer of thermally insulative material having a thermal resistance on the order of greater than 0.1063 (ft$^2$ hr ° F.)/BTU;
        b) an erosion layer of erosion resistant material disposed on top of the insulative layer;
        c) a bonding layer for bonding the insulative and erosion layers together.

2. An article in accordance with claim 1, wherein the insulative layer comprises epoxy foam.

3. An article in accordance with claim 1, wherein the erosion layer is comprised of polyurethane.

4. An article in accordance with claim 1, further comprising a structural layer disposed between the erosion layer and the insulative layer.

5. An article in accordance with claim 4, wherein the structural layer is comprised of a composite material.

6. An article in accordance with claim 4, wherein the structural layer is comprised of a fiberglass/epoxy ply.

7. A method of preventing the formation of ice comprising the steps of:
  a) providing an airfoil having a top;
  b) preventing the formation of ice on the top without requiring energy from a power source by disposing an anti-icing means on the top, the anti-icing means comprising an insulative layer of thermally insulative material having a thermal resistance on the order of greater than 0.1063 (ft$^2$ hr ° F.)/BTU, an erosion layer of erosion resistant material disposed on top of the insulative layer and a bonding layer for bonding the insulative layer to the erosion layer.

8. A method in accordance with claim 7, wherein the insulative layer comprises epoxy foam.

9. A method in accordance with claim 7, wherein the erosion layer is comprised of polyurethane.

10. A method in accordance with claim 7, further comprising a structural layer disposed between the erosion layer and the insulative layer.

11. A method in accordance with claim 10, wherein the structural layer is comprised of a composite material.

12. A method in accordance with claim 10, wherein the structural layer is comprised of a fiberglass/epoxy ply.

13. An article comprising:
  an airfoil having a top; and,
  anti-icing means disposed on the top for preventing the formation of ice without utilizing electrical or other forms of energy, the anti-icing means comprising
    a) an insulative layer of thermally insulative material having a thermal resistance on the order of greater than 0.1063 (ft$^2$ hr ° F.)/BTU;
    b) an erosion layer of erosion resistant material disposed on top of the insulative layer;
    c) a bonding layer for bonding the insulative and erosion layers together.

14. An article in accordance with claim 13, wherein the insulative layer comprises epoxy foam.

15. An article in accordance with claim 13, wherein the erosion layer is comprised of polyurethane.

16. An article in accordance with claim 13, further comprising a structural layer disposed between the erosion layer and the insulative layer.

17. An article in accordance with claim 16, wherein the structural layer is comprised of a composite material.

18. An article in accordance with claim 16, wherein the structural layer is comprised of a fiberglass/epoxy ply.

19. A method of preventing the formation of ice comprising the steps of:
  a) providing an airfoil having a top;
  b) preventing the formation of ice on the top without utilizing electrical or other forms of energy by disposing an anti-icing means on the top, the anti-icing means comprising an insulative layer of thermally insulative material having a thermal resistance on the order of greater than 0.1063 (ft$^2$ hr ° F.)/BTU, an erosion layer of erosion resistant material disposed on top of the insulative layer and a bonding layer for bonding the insulative layer to the erosion layer.

20. A method in accordance with claim 19, wherein the insulative layer comprises epoxy foam.

21. A method in accordance with claim 19, wherein the erosion layer is comprised of polyurethane.

22. A method in accordance with claim 19, further comprising a structural layer disposed between the erosion layer and the insulative layer.

23. A method in accordance with claim 22, wherein the structural layer is comprised of a composite material.

24. A method in accordance with claim 22, wherein the structural layer is comprised of a fiberglass/epoxy ply.

* * * * *